United States Patent
Hannah et al.

(10) Patent No.: US 8,127,604 B2
(45) Date of Patent: Mar. 6, 2012

(54) LIQUID LEVEL SENSOR FOR GALLEY INSERTS

(75) Inventors: Gary R. Hannah, Lenexa, KS (US); Nathaniel F. Yoder, Kingsville, MO (US); Jeff Renz, Overland Park, KS (US); David Weiss, Shawnee, KS (US)

(73) Assignee: B/E Intellectual Property, Inc., Lenexa, KS (US)

( * ) Notice: Subject to any disclaimer, the term of this patent is extended or adjusted under 35 U.S.C. 154(b) by 213 days.

(21) Appl. No.: 12/258,055

(22) Filed: Oct. 24, 2008
(Under 37 CFR 1.47)

(65) Prior Publication Data

US 2011/0011177 A1    Jan. 20, 2011

Related U.S. Application Data

(60) Provisional application No. 60/982,185, filed on Oct. 24, 2007.

(51) Int. Cl.
*G01F 23/24* (2006.01)

(52) U.S. Cl. ............. 73/304 R; 116/109; 116/227

(58) Field of Classification Search ............... 73/304 R; 116/109, 227
See application file for complete search history.

(56) References Cited

U.S. PATENT DOCUMENTS 3,741,656 A    6/1973    Shapiro
(Continued)

FOREIGN PATENT DOCUMENTS

DE    3000105 A1    7/1981
(Continued)

OTHER PUBLICATIONS

International Search Report issued May 20, 2009, pp. 1-3.

*Primary Examiner* — Hezron E Williams
*Assistant Examiner* — Paul West
(74) *Attorney, Agent, or Firm* — Fulwider Patton LLP

(57) ABSTRACT

The liquid level sensing device includes rotating electrically conductive probes and uses a self-cleaning rotary electrical connection system with a contact stylus on a rotating conductive barrel, for sensing a liquid level in a dispensing container of an aircraft galley insert. The probes, pivot arms of the probes, rotating drum and stylus may have an exterior surface formed of an electrically conductive, corrosion resistant material.

14 Claims, 1 Drawing Sheet

U.S. PATENT DOCUMENTS

| | | | |
|---|---|---|---|
| 3,916,963 A * | 11/1975 | McIntosh | 141/198 |
| 4,247,784 A | 1/1981 | Henry | |
| 4,390,793 A | 6/1983 | John | |
| 4,556,265 A * | 12/1985 | Cunningham | 439/63 |
| 4,825,758 A * | 5/1989 | Snowball et al. | 99/282 |
| 4,873,863 A | 10/1989 | Bruhl et al. | |
| 5,603,238 A | 2/1997 | Williamson | |
| 5,660,295 A | 8/1997 | Hroma et al. | |
| 6,082,419 A | 7/2000 | Skell et al. | |
| 6,409,046 B1 | 6/2002 | Peckels | |
| 6,843,124 B2 | 1/2005 | Otto et al. | |
| 6,847,660 B2 | 1/2005 | Morikawa et al. | |
| 7,293,458 B2 | 11/2007 | Ramus et al. | |
| 2003/0223221 A1 | 12/2003 | Yeh et al. | |
| 2004/0035197 A1 | 2/2004 | D'Antonio et al. | |
| 2006/0132320 A1 | 6/2006 | Branzell et al. | |

FOREIGN PATENT DOCUMENTS

| | | |
|---|---|---|
| EP | 1157647 A2 | 11/2001 |
| GB | 1224292 A | 3/1971 |
| GB | 2099791 A | 12/1982 |
| GB | 2203633 A | 10/1986 |

* cited by examiner

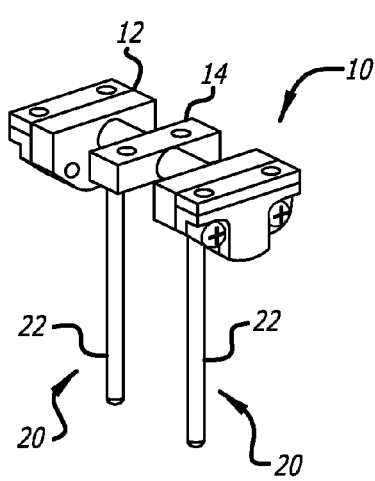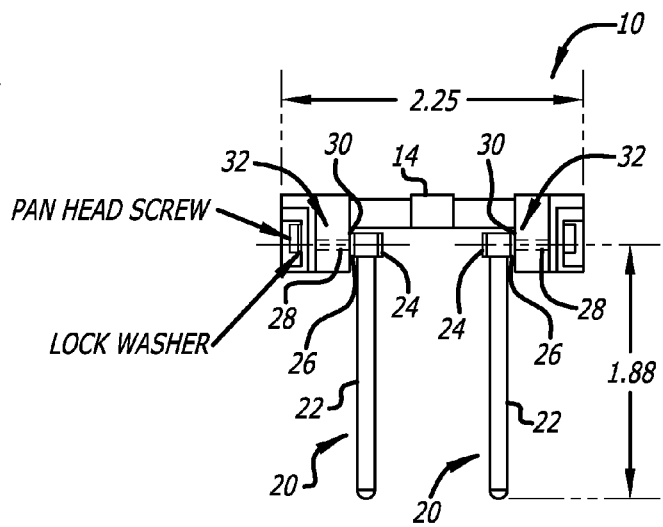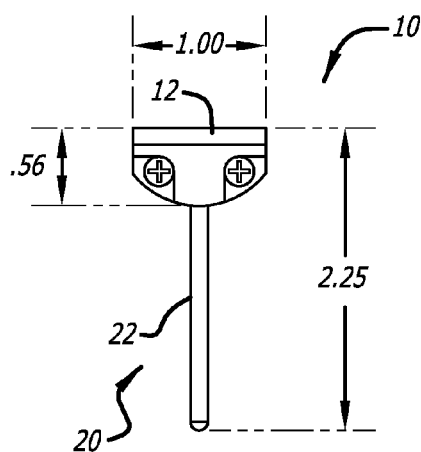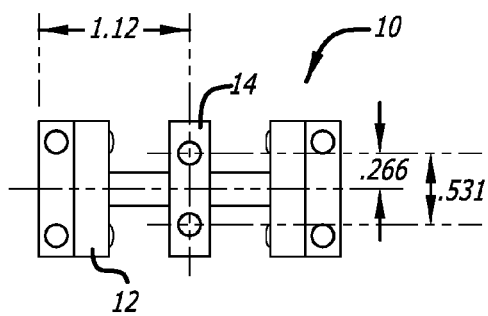
FIG. 1
FIG. 2
FIG. 3
FIG. 4

LIQUID LEVEL SENSOR FOR GALLEY INSERTS

BACKGROUND OF THE INVENTION

1. Field of the Invention

This invention relates generally to liquid level detection systems, and more particularly relates to a liquid level sensor for detecting liquid levels in beverage maker galley inserts, such as in coffee or hot water containers in galley inserts on aircraft.

2. General Background and State of the Art

One conventional technique for determining the level of a liquid in a vessel or container involves mechanically measuring the liquid level with a dipstick or probe which extends into the liquid to be measured. When such techniques are used for measuring liquid level in a server container of a beverage brewing apparatus such as a coffee brewing machine, these techniques require a sensing device to extend into the server container.

Previous mechanical sensing devices, such as for measuring liquid levels in coffee or hot water containers in galley inserts on aircraft, typically have relied on exposed metal-to-metal contacts that would oxidize or become dirty with coffee residue and not function properly. Due to the configuration and physical constraints of such sensing devices, the liquid level sensor is required to have flexible or rotational electrical contacts. The operation of the sensing devices was compromised because of dirt, coffee residue, oxidation and wear, and the exposed electrical connections in such sensing devices typically would become unreliable and intermittent, so that the liquid level sensing devices would require cleaning very frequently. In addition, the liquid level sensing devices would oxidize without use and the beverage maker galley insert would not function if the unit was stored for a period of time. The result was an intermittent electrical contact of the liquid level sensor. If electrical contact failed in the rotating electrical contact joint, the coffee or hot water container could overflow.

It would therefore be desirable to provide a liquid level sensing device that will assure a continuous electrical contact of a moving probe to a wired connection to a controlling circuit board for preventing highly undesirable accidental overflows of liquid containers in galley inserts on aircraft such as may occur with present system of liquid level sensors. The present invention satisfies these and other requirements for aircraft galley systems.

SUMMARY OF THE INVENTION

Briefly, and in general terms, the present invention provides a liquid level sensing device that uses a rotary electrical connection system with a contact stylus on a rotating conductive barrel, for coffee makers or aircraft coffee makers for aircraft galley inserts. The liquid level sensing device provides a more robust and continuous electrical contact, improves the method for sealing out contamination and removes the opportunity for oxidation to occur. By using a contact stylus on a rotating conductive barrel, a "self-cleaning" action results and ensures continuous electrical contact.

The liquid level sensing device is used for sensing a liquid level in a dispensing container, for example, for communicating the liquid level to the controls of galley inserts, such as coffee makers, tea makers and water boilers for use in aircraft and other transportation vehicles that use such galley insert units. The device accurately tells the galley insert unit if a dispensing container is full or not. Typically, when such a dispensing container is half full the galley insert will be allowed to operate until a predetermined level is achieved, at which time operation of the galley insert will be discontinued.

In a presently preferred aspect, the liquid level sensing device includes wire fingers or probes that are in constant contact with a pivot arm rotatably connected to a rotating drum or barrel and associated stylus. In a presently preferred aspect, the wire fingers are gold plated, the pivot arms to which the wire fingers are attached, and the rotating drum and stylus are gold plated. Other suitable conducting materials may be used for coating the rotating drum and stylus, such as silver, for example. In a preferred aspect, there may be multiple sets of wire fingers to ensure that redundant contact is maintained at all times. The liquid level sensing device also utilizes a cover that seals the body of the unit that ensures contamination is not introduced into the electrical contact area. The liquid level sensing device includes a universal mounting that permits adaptation for several different galley inserts to utilize liquid level sensing device of the invention.

The liquid level sensing device of the present invention provides a very robust electrical contact that has a very long life compared to the previous designs. It also seals out contamination from the electrical contacts. The rotating contact on the level sensor has a self-wiping cleaning action.

Retrofit of the new sensor is "plug and play." The impact and labor of changing the current drawings that call out the new design is minimal. The certification with the regulatory agency is minor because of the minimal change in the technological approach to liquid level sensing.

The invention improves the overall reliability of the inserts by allowing fewer removals for maintenance and eliminates intermittent failures. It also incorporates a universal installation that adapts different styles of sensing devices into this one unit. This rotary contact system can be integrated into coffee server cover plate style retainers.

By replacing a conventional liquid level sensor in an aircraft beverage maker galley insert with the liquid level sensor of the present invention, the beverage maker galley insert will not require cleaning as often, and will reduce the requirements for maintenance of beverage maker galley inserts, thus reducing the number of unscheduled removals of the existing beverage maker galley inserts from the aircraft. These and other aspects of the invention will become apparent from the following detailed description and the accompanying drawings, which illustrate by way of example the features of the invention.

BRIEF DESCRIPTION OF THE DRAWINGS

FIG. 1 is a perspective view of the liquid level sensing device according to the present invention.

FIG. 2 is a front view of the liquid level sensing device of FIG. 1.

FIG. 3 is a side elevational view of the liquid level sensing device of FIG. 1.

FIG. 4 is top plan view of the liquid level sensing device of FIG. 1.

DETAILED DESCRIPTION OF THE PREFERRED EMBODIMENTS

Referring to the drawings, which are provided by way of example, and not by way of limitation, the present invention provides for a liquid level sensing device, having a rotary electrical connection system for aircraft galley inserts, for electrical communication to the controls of galley inserts, such as coffee makers, tea makers, water boilers and the like, for use in aircraft and other transportation vehicles that use such galley insert units. The liquid level sensing device accurately tells the galley insert unit if the dispensing container is full or not. In the case of only being half full the device will allow the insert to operate until a pre-determined level is achieved, at which time operation of the galley insert will be discontinued. The rotary contact system of the invention can be integrated into coffee server cover plate style retainers and the like.

Referring to FIGS. 1-4, the liquid level sensing device 10 includes a housing 12 that serves as a base and an insulating cover, and which is typically made of a rigid electrically insulating material such as polysulfone, for example, that seals the body of the unit and ensures contamination is not introduced into the electrical contact area. The housing includes a central universal mounting member 14 that permits mounting of the liquid level sensing device to several different galley inserts.

The liquid level sensing device also advantageously includes a plurality of rotating electrically conductive probes 20 to ensure that redundant contact is maintained at all times. The rotating electrically conductive probes include a finger portion 22 extending from a rotating conductive drum or barrel base portion 24 including a rotatable contact stylus or end plate 26. The rotating electrically conductive probes, may be formed as a pair of gold plated wire fingers extending from the rotating conductive drum or barrel base portion, rotatably mounted to the housing by a pivot arm 28 extending from the rotating conductive base portion transverse to the finger portion, and rotatably connected to the housing, and extending through an annular inner stationary contact ring 30 mounted to the housing and situated between the contact stylus or end plate and the housing. The contact stylus or end plate and the annular inner stationary contact ring form a rotary electrical connection or rotating electrical contact joint 32, which operates with a self-wiping, "self cleaning" or action that ensures continuous electrical contact.

The probes, contact stylus and contact ring may be made of electrically conductive, corrosion resistant material such as gold plated brass, or may alternatively be made of similar materials, such as a silver alloy, or stainless steel, for example. An electrical line (not shown) may be operatively electrically connected attached to the annular inner stationary contact ring to form a wired electrical connection to a controlling circuit board (not shown), allowing the controlling circuit to be in constant contact with the rotating electrically conductive probes or pivot arms. In testing, the liquid level sensing device has been shown to operate successfully for up to 88,000 cycles without failure.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A liquid level sensing device for aircraft galley inserts, the liquid level sensing device comprising:
  a housing;
  a plurality of rotating electrically conductive probes connected to said housing by a rotating electrical contact joint which operates with a self cleaning action that ensures continuous electrical contact, each of said plurality of rotating electrically conductive probes including a rotating conductive drum base portion having a rotatable contact end plate; and
  an annular inner stationary contact ring mounted to said housing, said annular inner stationary contact ring being disposed between said rotatable contact end plate and said housing.

2. The liquid level sensing device of claim 1, wherein each of said plurality of rotating electrically conductive probes includes a finger portion extending from said rotating conductive drum base portion.

3. The liquid level sensing device of claim 2, wherein each of said plurality of rotating electrically conductive probes includes a pivot arm extending from said rotating conductive drum base portion transverse to said finger portion, said pivot arm being rotatably connected to said housing.

4. The liquid level sensing device of claim 3, wherein said pivot arm extends through said annular inner stationary contact ring.

5. The liquid level sensing device of claim 1, wherein each of said probes, said rotatable contact end plate and said annular inner stationary contact ring has an exterior surface formed of an electrically conductive, corrosion resistant material.

6. The liquid level sensing device of claim 1, wherein said housing includes a central universal mounting member that permits mounting of the liquid level sensing device to galley inserts.

7. A liquid level sensing device for aircraft galley inserts, the liquid level sensing device comprising:
  a housing;
  a plurality of rotating electrically conductive probes connected to said housing by a rotating electrical contact joint which operates with a self cleaning action that ensures continuous electrical contact, each of said plurality of rotating electrically conductive probes including a rotating conductive barrel base portion having a rotatable contact end plate, and a finger portion extending from said rotating conductive barrel base portion; and
  an annular inner stationary contact ring mounted to said housing, said annular inner stationary contact ring being disposed between said rotatable contact end plate and said housing.

8. The liquid level sensing device of claim 7, wherein each of said plurality of rotating electrically conductive probes includes a pivot arm extending from said rotating conductive barrel base portion transverse to said finger portion, said pivot arm being rotatably connected to said housing.

9. The liquid level sensing device of claim 8, wherein said pivot arm extends through said annular inner stationary contact ring.

10. The liquid level sensing device of claim 7, wherein each of said probes, said rotatable contact end plate and said annular inner stationary contact ring has an exterior surface formed of an electrically conductive, corrosion resistant material.

11. The liquid level sensing device of claim 7, wherein said housing includes a central universal mounting member that permits mounting of the liquid level sensing device to galley inserts.

12. A liquid level sensing device for aircraft galley inserts, the liquid level sensing device comprising:
  a housing;
  a plurality of rotating electrically conductive probes connected to said housing by a rotating electrical contact joint which operates with a self cleaning action that ensures continuous electrical contact, each of said plurality of rotating electrically conductive probes including a rotating conductive base portion having a rotatable contact end plate, and a finger portion extending from said rotating conductive base portion, and each of said plurality of rotating electrically conductive probes including a pivot arm extending from said rotating conductive base portion transverse to said finger portion, said pivot arm being rotatably connected to said housing; and an annular inner stationary contact ring mounted to the housing, and disposed between said rotatable contact end plate and said housing, and said pivot arm extending through said annular inner stationary contact ring.

13. The liquid level sensing device of claim 12, wherein each of said probes, said rotatable contact end plate and said annular inner stationary contact ring has an exterior surface formed of an electrically conductive, corrosion resistant material.

14. The liquid level sensing device of claim 12, wherein said housing includes a central universal mounting member that permits mounting of the liquid level sensing device to galley inserts.

* * * * *